(12) United States Patent
Boulton

(10) Patent No.: US 10,719,610 B2
(45) Date of Patent: Jul. 21, 2020

(54) GENERATING SECURITY MANIFESTS FOR SOFTWARE COMPONENTS USING BINARY STATIC ANALYSIS

(71) Applicant: BlackBerry Limited, Waterloo (CA)

(72) Inventor: Adam John Boulton, Wirral (GB)

(73) Assignee: BlackBerry Limited, Waterloo, Ontario (CA)

( * ) Notice: Subject to any disclaimer, the term of this patent is extended or adjusted under 35 U.S.C. 154(b) by 204 days.

(21) Appl. No.: 15/676,794

(22) Filed: Aug. 14, 2017

(65) Prior Publication Data
US 2019/0050576 A1    Feb. 14, 2019

(51) Int. Cl.
| | | |
|---|---|---|
| G06F 11/00 | (2006.01) | |
| G06F 21/57 | (2013.01) | |
| G06F 8/41  | (2018.01) | |
| G06F 21/51 | (2013.01) | |
| G06F 21/56 | (2013.01) | |
| G06F 12/14 | (2006.01) | |

(52) U.S. Cl.
CPC ............ G06F 21/577 (2013.01); G06F 8/43 (2013.01); G06F 21/51 (2013.01); G06F 21/562 (2013.01); G06F 2221/033 (2013.01)

(58) Field of Classification Search
CPC ...... G06F 21/51; G06F 21/562; G06F 21/577; G06F 2221/033; G06F 8/43
USPC ................................. 726/24, 25, 26; 706/54
See application file for complete search history.

(56) References Cited

U.S. PATENT DOCUMENTS

| | | | |
|---|---|---|---|
| 7,392,545 | B1 | 6/2008 | Weber et al. |
| 9,058,492 | B1 * | 6/2015 | Satish ................ G06F 21/50 |
| 9,785,422 | B1 * | 10/2017 | Cong .................... G06F 8/33 |
| 10,108,798 | B1 * | 10/2018 | Friedman ............ G06F 21/563 |
| 2004/0230835 | A1 | 11/2004 | Goldfeder et al. |
| 2011/0307956 | A1 * | 12/2011 | Yermakov ........... G06F 21/563 726/24 |
| 2012/0017280 | A1 | 1/2012 | Wiegenstein et al. |

(Continued)

FOREIGN PATENT DOCUMENTS

| | | |
|---|---|---|
| EP | 2793160 | 10/2015 |
| WO | 2012084507 | 6/2012 |

OTHER PUBLICATIONS

Melski, "Preventing Exploits Against Software of Uncertain Provenance (PEASOUP)," AFRL-RY-WP-TR-2015-0017, GrammaTech Inc., retrieved from URL http://www.dtic.mil/get-tr-doc/pdf?AD=ADA623732, May 1, 2015, 257 pages.

(Continued)

*Primary Examiner* — Gary S Gracia
(74) *Attorney, Agent, or Firm* — Fish & Richardson P.C.

(57) ABSTRACT

Systems, methods, and software can be used to generating security manifests for software components using binary static analysis. In some aspects, one computer-implemented method includes performing a binary static analysis of a binary software component to determine one or more security characteristics of the binary software component; generating a security manifest for the binary software component including the determined one or more security characteristics of the binary software component; and providing the security manifest to a software management system configured to determine whether to deploy the binary software component based on the security manifest.

37 Claims, 4 Drawing Sheets

(56) References Cited

U.S. PATENT DOCUMENTS

| | | | |
|---|---|---|---|
| 2014/0373157 A1 | 12/2014 | Guarnieri et al. | |
| 2015/0047049 A1* | 2/2015 | Panchenko | G06F 21/54 |
| | | | 726/26 |
| 2016/0179486 A1* | 6/2016 | Sheth | G06F 8/427 |
| | | | 717/144 |
| 2016/0179586 A1* | 6/2016 | Wang | G06F 9/528 |
| | | | 711/125 |
| 2016/0232358 A1 | 8/2016 | Grieco et al. | |
| 2016/0299765 A1* | 10/2016 | Wesie | G06F 9/4401 |

OTHER PUBLICATIONS

International Search Report and Written Opinion issued in International Application No. PCT/EP2018/071775 dated Sep. 19, 2018, 15 pages.

International Preliminary Report on Patentability in International Application No. PCT/EP2018071,775, dated Feb. 27, 2020, 10 pages.

* cited by examiner

```
<SecurityPosture xmlns:companyx="http://schemas.companyx.com/
security/hardening"
xmlns:tools="http://schemas.companyx.com/tools"
>
```
— 210

```
<CompilerDefenses>
  aslr.present="true",
  stackCookies.present="true",
  stackCookies.coverage="20%",
</CompilerDefenses>
```
— 220

```
<CVE>
  cve-2017-123,
  cve-2014-624,
  cve-2015-666,
</CVE>
```
— 230

```
<CraftsmanShip>
  tools:insecureApi="memcpy,strcpy,sprintf"
</Craftsmanship>
```
— 240

```
</SecurityPosture>
```

GENERATING SECURITY MANIFESTS FOR SOFTWARE COMPONENTS USING BINARY STATIC ANALYSIS

TECHNICAL FIELD

The present disclosure relates to generating security manifests for software components using binary static analysis.

BACKGROUND

In some cases, systems may include various software components configured to control different aspects of the system. Software components can control different types of functionality in different types of systems. For example, an automobile may include software to control entertainment components, such as, for example, a television, a Blu-ray player, a stereo system, or other components, or operational components, such as a safety system, a braking system, or other components.

In some cases, software components can be updated in the system over a network. As new versions of the software component become available, the new versions can be sent to the system over a network. For example, the automobile can receive new versions of the software components over a cellular connection. Once the new version is received, a controller within the automobile can replace the currently running version of the software component with the received new version.

DESCRIPTION OF DRAWINGS

FIG. 2 illustrates an example security manifest, according to an implementation.

Like reference numbers and designations in the various drawings indicate like elements.

DETAILED DESCRIPTION

Figure 1:
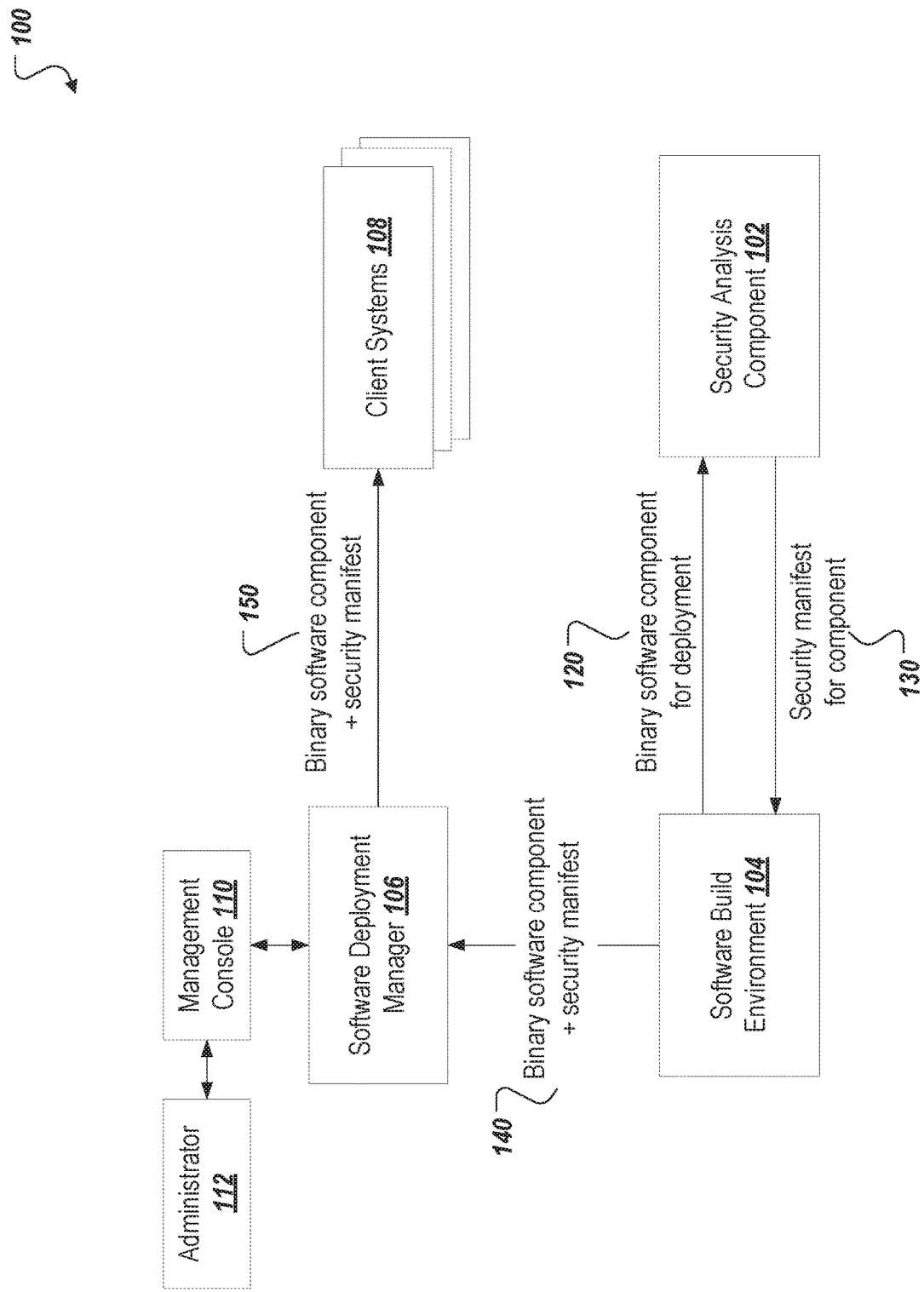
FIG. 1 is a schematic diagram showing a system that generates a security manifest for a software component, according to an implementation.

In some cases, software components may execute in systems connected to, or accessible via, public networks such as the Internet. In such cases, security vulnerabilities in a particular software component may be exploited by external actors accessing the system over the public networks. If the software component receives data from the public network, an external actor could exploit these security vulnerabilities using various techniques. For example, if the software component receives data from the network without checking the bounds of the memory buffer into which the data is copied, the external actor could inject arbitrary instructions into the software component's memory by sending a message to the software component specifically sized to exceed the bounds of the buffer. The excess data would be written by the software component into the memory locations immediately following the memory buffer. If the external actor includes its arbitrary instructions in this excess data portion of the message, the instructions will be written into the memory of the running software component, and possibly executed. Such an exploit is referred to as a buffer overflow attack. Other types of exploits are also possible depending on the security vulnerabilities present in the software component.

Software developers can combat these security vulnerabilities by using software development techniques to protect against them. For example, to lessen the risk of a software component being exploited by a buffer overflow attack, a software developer can explicitly check the size of the memory buffer before copying network data into it. The software developer can also use secure application programming interfaces (APIs) that automatically check the size of the memory buffer when copying, compiler defensive techniques (e.g., stack cookies, address space layout randomization (ASLR)) specifically designed to protect against buffer overflow attacks, or other techniques. However, if the user of the software component does not have access to its source code, which is often the case if the software is provided by an external vendor, it can be challenging for the user to verify that the software component uses these software development techniques. Identifying security vulnerabilities in the software component can also be difficult without examining the source code. The user can be left to trust assurances from the software vendor regarding the software component's security posture.

The present disclosure describes techniques for generating a security manifest for a binary software component image in order to assess the security posture of the software component without examining its source code. In some cases, a binary static analysis of the component is performed to determine security characteristics of the component. The security characteristics can include known security vulnerabilities present in the binary software component, defensive techniques implemented in the binary software component (e.g., stack cookies, ASLR), insecure APIs used by the binary software component, and other characteristics. A security manifest for the binary software component is then generated based on the determined security characteristics. The security manifest can be a plain text or binary representation of the determined security characteristics, and can utilize well-known data formats (e.g., eXtensible Markup Language (XML), or proprietary formats). The security manifest is provided to a software management system that can determine whether to deploy the binary software component based on the information in the security manifest.

Figure 3:
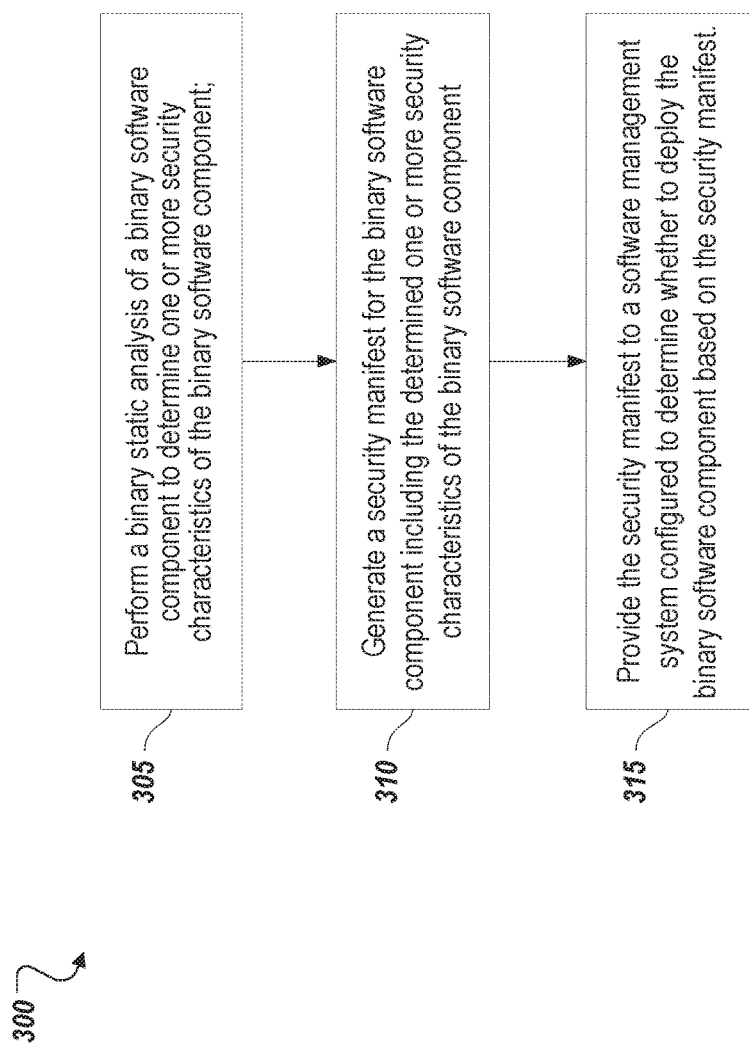
FIG. 3 is a flow diagram showing a method for generating a security manifest for a software component, according to an implementation.

FIGS. 1-3 and associated descriptions provide additional details of these implementations. These approaches provide a mechanism to increase the overall security software quality of a system by verifying the security posture of binary software components prior to deployment. This may force software vendors to scan and acknowledge product security posture, and possibly address specific identified vulnerabilities, before being able to deliver software components to a user, including, but not limited to, applications, libraries, drivers, modules, or other types of software components, as well as patches, updates, or other forms of changes to existing software components. The approaches described herein can also enable a user to set objective security criteria for software components and updates to be deployed on their systems, and to reject software components and updates that do not meet these security criteria.

FIG. 1 is a schematic diagram showing a system 100 that generates a security manifest for a software component, according to an implementation. The system 100 includes a security analysis component 102, a software build environment 104, a software deployment manager 106, client systems 108, and a management console 110 used by an administrator 112.

The software build environment 104 comprises a system for building binary software components. The software build environment 104 can include one or more computing devices. The computing devices may execute software programs used to develop and build binary software components, such as, for example, compilers, linkers, source code management programs, debugging programs, and other software programs. In some cases, software build environment 104 can execute a compiler program to produce a binary software component from source code. The source code can be formatted according to different programming languages, including, but not limited to, C, C++, Visual Basic, Java, assembly language, or Objective-C. The compiler program can be a program specifically designed to compile the source code in its particular programming language.

The security analysis component 102 comprises a system for performing binary static analysis on software components to generate a security manifest. The security analysis component 102 can include one or more computing devices executing software programs to perform the binary static analysis of software components and to generate the corresponding security manifests.

Binary static analysis involves examining the binary representation of a compiled binary software component to determine its attributes and to deduce its possible behaviors upon execution. Binary static analysis is performed without reference to the source code that was compiled to create the binary software component, and is generally performed without executing the binary software component. For example, a software program can perform binary static analysis on a binary software component by examining the structure of the binary data making up the binary software component. The binary static analysis program can identify attributes of the binary software component by examining an information header included in the binary software component by the compiler that created the component. The binary static analysis program can also identify attributes of the binary software component by examining the structure of the program itself, such as, for example, by identifying functions defined in the program, APIs used by the program, compiler defensive techniques implemented in the functions defined in the program, and other features of the binary software component.

The software deployment manager 106 comprises a system for managing the deployment of new binary software components and updates to existing binary software components to client systems 108. Software deployment manager 106 can include one or more computing devices configured to receive binary software components for deployment from a source (e.g., software build environment 104). The software deployment manager 106 can control deployment of the received binary software components to the client systems 108 including, but not limited to, determining whether a particular binary software component should be deployed, determining a schedule for deployment of the binary software component to the client systems 108, sending the binary software component to the client systems 108 deployment (e.g., over a network, not shown), and other actions.

The management console 110 comprises a user interface that enables an administrator 112 to set and modify operating parameters of the software deployment manager 106. In some cases, the management console 110 can be a webpage provided to a computing device of the administrator 112 by Web server program executed by the software deployment manager 106. The management console 110 can also be a software program executed by the computing device of the administrator 112 that sends commands to the software deployment manager 106 to set and modify operating parameters of the software deployment manager 106.

Client systems 108 comprise computing devices that receive binary software components and updates from the software deployment manager 106. In some cases, the client systems 108 can replace existing versions of the binary software components with new versions received from the software deployment manager 106, and can install new binary software components received from the software deployment manager 106. In some cases, client systems 108 can receive the binary software components from the software deployment manager 106 over a network, such as, for example, a cellular network, an ETHERNET network, a Wi-Fi network, a BLUETOOTH network, or other types of wired or wireless networks, including any combinations. Client systems 108 can be embedded computing devices included in different types of systems, including, but not limited to, vehicles, ADAS (advanced driver assistance systems), manufacturing control systems, physical security systems, or other types of systems. Vehicles can include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. Client systems 108 can also comprise any endpoints or computing devices in database systems, distributed computing systems, content delivery systems, information processing systems, or other types of systems. Endpoints can include any one or more of the following: mobile devices (e.g., smartphones, tablets, laptops, wearables, gaming devices, navigation devices, cameras, etc.), computers, servers, IoT (Internet of Things) devices (e.g., vehicles, buildings including homes, appliances, smart devices, connected devices, etc.), EoT (Enterprise of Things) devices (i.e., IoT devices in an enterprise) and any other nodes.

In one example operation, the security analysis component 102 can receive a binary software component from the software build environment 104 (120). The security analysis component 102 can perform binary static analysis on the binary software component and generate a security manifest detailing security characteristics of the binary software component. The security analysis component 102 can send the generated security manifest for the binary software component to the software build environment 104. In some cases, a security manifest can be included in the binary software component itself, such as by prepending the security manifest to the binary software component as a header.

The software build environment 104 may send the binary software component and the generated security manifest to the software deployment manager 106 (140). The software deployment manager 106 may analyze the received security manifest to determine whether the corresponding binary software component should be deployed to the client systems 108. If the software deployment manager 106 determines, based on the security manifest, that the binary software component should be deployed, software deployment manager 106 deploys the binary software component to the client systems 108 (150).

In another example operation, the security analysis component 102 receives a binary software component from the software build environment 104. The security analysis component 102 analyzes the binary software component and determines that the binary software component makes use of the insecure API "memcpy." Security analysis component 102 generates a security manifest for the binary software component and sends it to the software build environment 104 (130). The software build environment 104 sends the binary software component and the generated security manifest to the software deployment manager 106. Software deployment manager 106 examines the security manifest and identifies that the binary software component uses the insecure API "memcpy." Software deployment manager 106 then examines a security policy associated with the binary software component, and determines that the security policy prevents the deployment of binary software components of this type, that use insecure APIs. Based on this, software deployment manager 106 determines not to deploy the binary software component. Alternatively or additionally, the client systems 108 may perform a similar examination of the security manifest based on their own associated security policies, and may choose to accept or reject the binary software component based on whether the attributes in the security manifest indicate that the binary software component complies with a corresponding security policy.

FIG. 2 illustrates an example security manifest 200, according to an implementation. The example security manifest 200 is formatted according to the XML standard. In some cases, other formats can be used, including, but not limited to, JavaScript Object Notation (JSON), key value pairs, or other plaintext or binary formats.

The security manifest 200 can include an identification header 210 comprising an identification of the entity that generated the security manifest 200, in this case an entity named "companyx." Identification header 210 also includes XML namespace attributes ("xmlns") that allow aliases to be defined in order to access XML attributes with short names. For example, the line "xmlns:tools="http://schemas.companyx.com/tools" " means that the text "tools" in an attribute name that should be replaced with the specified URL when examining the security manifest 200. These XML namespace attributes are specific to XML, and thus an identification header using a different format may not include these attributes or may include different attributes.

The security manifest 200 can include compiler defenses information 220 comprising information about compiler defensive techniques implemented in the binary software component. For example, the line "aslr:present="true" " in the compiler defenses section 220 indicates that the binary software component represented by the security manifest 200 was built using the ASLR compiler defensive technique. The line "stackCookies:present="true" " in the compiler defenses section 220 indicates that the binary software component represented by the security manifest 200 was built using the stack cookies compiler defensive technique. The line "stackCookies:coverage="20%" " in the compiler defenses section 220 indicates that 20% of the functions in the binary software component implement the stack cookies compiler defensive technique.

The security manifest 200 can include CVE information 230 comprising information about Common Vulnerabilities and Exposures (CVEs) present in the binary software component corresponding to the security manifest 200. CVEs are publicly known cyber security vulnerabilities compiled and cataloged by various security organizations, such as the U.S. National Vulnerability Database operated by the National Institute of Standards and Technology (NIST). CVEs are identified using CVE identifiers, such as the three identifiers ("cve-2017-123", "cve-2014-624", "cve-2015-666") listed in the CVE section 230. Each of these CVEs represents a specific vulnerability identified in the binary software component associated with the example security manifest 200. For example, "cve-2017-123" may represent a buffer overflow vulnerability that would allow an external actor to inject arbitrary instructions into the running process. If binary static analysis of a binary software component indicates that the binary software component includes this vulnerability, the CVE identifier "cve-2017-123" can be inserted into the security manifest for the binary software component.

The security manifest 200 can include craftsmanship information 240 comprising one or more attributes related to the craftsmanship of the source code from which the binary software component was built. The example craftsmanship section 240 includes an attribute indicating insecure APIs used by the binary software component associated with the security manifest 200. As shown, the attribute indicates that the binary software component associated with the security manifest 200 makes use of insecure APIs (memcpy, strcpy, and sprintf). Each of these APIs is insecure because it does not check the bounds of the memory location into which it is copying data. In some cases, the craftsmanship section 240 can include other attributes related to the source code craftsmanship of the binary software component, including, but not limited to, an indication of deprecated APIs used by the binary software component, an indication of faulty error handling behavior, the use of a compromised compiler version to build the binary software component, or other attributes.

FIG. 3 is a flow diagram showing a method 300 for generating a security manifest for a software component, according to an implementation. At 305, a binary static analysis of a binary software component is performed by a security analysis component (e.g., 102) to determine one or more security characteristics of the binary software component. In some implementations, the one or more security characteristics included in the security manifest include one or more compiler defense characteristics indicating defensive techniques employed by a compiler used to build the binary software component. The defensive techniques indicated by the one or more compiler defense characteristics can include at least one of address space layout randomization (ASLR) or stack cookies. In some cases, the one or more security characteristics included in the security manifest include one or more common vulnerability exposures (CVEs) representing known security vulnerabilities present in the binary software component. The one or more security characteristics included in the security manifest may also include one or more insecure application programming interfaces (APIs) used by the binary software component, such as memcpy, strcpy, and sprintf.

At 310, a security manifest for the binary software component is generated by the security analysis component including the determined one or more security characteristics of the binary software component.

At 315, the security manifest is provided by the binary software component to a software management system configured to determine whether to deploy the binary software component based on the security manifest. In some cases, the software management system is configured to compare the one or more security characteristics in the security manifest to a security policy to determine whether to deploy the binary software component.

Figure 4:
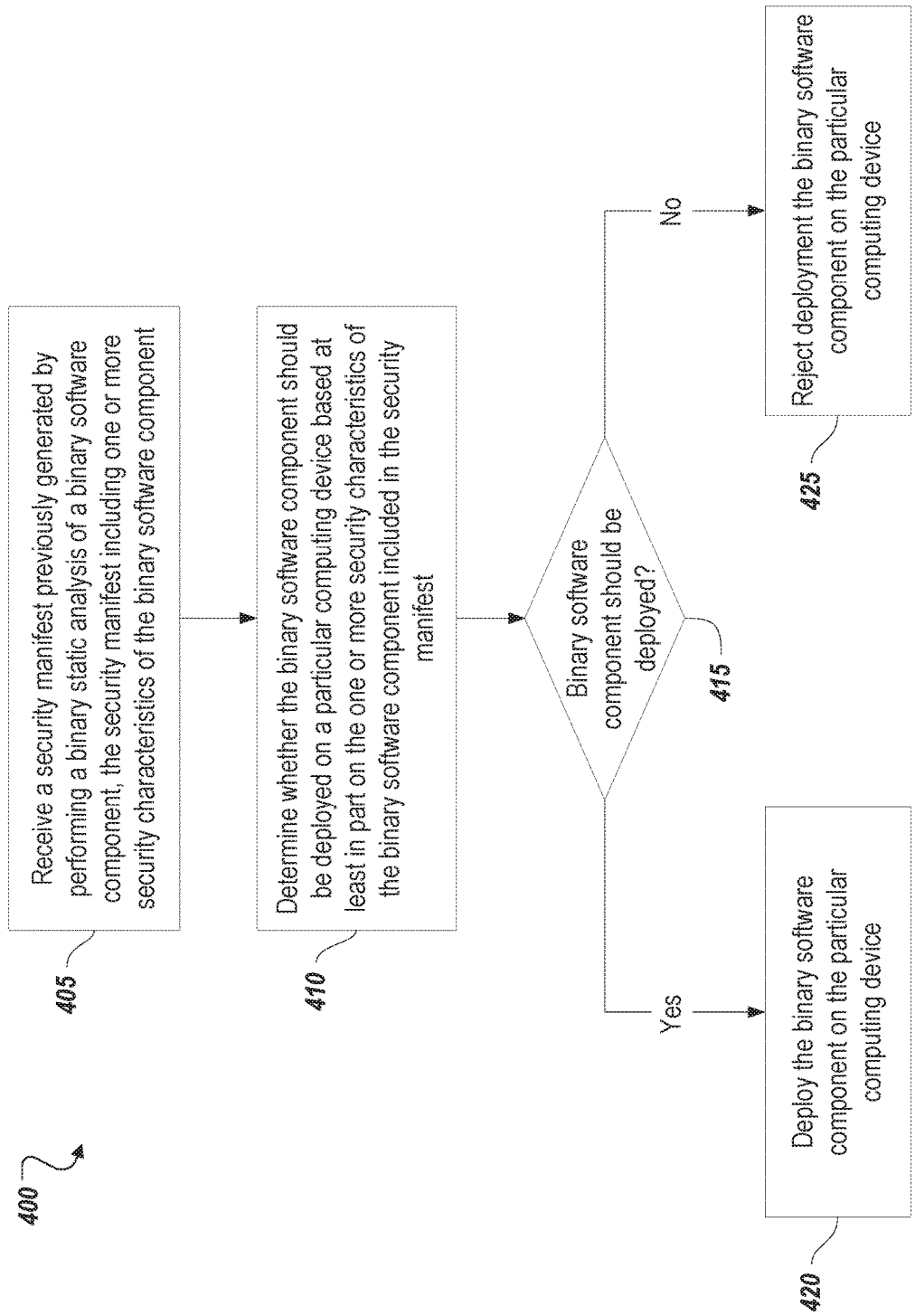
FIG. 4 is a flow diagram showing a method for determining whether to deploy a software component on a computing device based on a security manifest, according to an implementation.

FIG. 4 is a flow diagram showing a method 400 for determining whether to deploy a software component on a computing device based on a security manifest, according to an implementation. At 405, a security manifest including one or more security characteristics of a binary software component is received. The security manifest may be received by a software deployment manager (e.g., 106), a client system (e.g., 108), or by other components. The received security manifest was previously generated by performing a binary static analysis of a binary software component, for example by a security analysis component (e.g., 102).

At 410, a determination is made whether the binary software component should be deployed on a particular computing device based at least in part on the one or more security characteristics of the binary software component included in the security manifest. In some cases, determining whether the binary software component should be deployed includes determining whether the one or more security characteristics of the binary software component included in the security manifest meet or exceed required security characteristics. The required security characteristics may include minimum security characteristics for binary software components deployed on the particular computing device. In some implementations, the required security characteristics include minimum security characteristics for binary software components deployed on the particular computing device. The required security characteristics may include minimum security characteristics for a type of software component associated with the binary software component.

At 415, the method 400 branches based on whether the determination at 410 indicates that the binary software component should be deployed or should not be deployed to the particular computing device.

At 420, in response to a determination at 410 that the binary software component should be deployed, the binary software component is deployed on the particular computing device. Deploying the binary software component may include copying the binary software component to a storage device associated with the particular computing device, running an installation program associated with the binary software component or the particular computing device to install the binary software component, instructing an external component to deploy the binary software component on the particular computing device, or other actions or combinations of actions.

At 425, in response to a determination at 410 that the binary software component should not be deployed, deployment of the second binary software component is rejected. In some cases, determining that the binary software component should not be deployed includes determining that the one or more security characteristics of the binary software component included in the security manifest do not meet or exceed required security characteristics. Rejecting deployment of the second binary software component may include providing an indication that the second binary software component was rejected. The indication may be provided to an entity such as a user of the particular computing device, an administrator, the entity that provided the second binary software component, the developer of the binary software component, or other entity. Rejecting deployment may include any one or more of the following: prohibiting loading of the binary software component in memory of the computing device, prohibiting installation of the binary software component on the computing device, prohibiting execution of the binary software component on the computing device, prohibiting copying or saving the binary software component in memory of the computing device, deleting the binary software component from the computing device, and other actions or combinations of actions.

In some implementations, a software deployment manager (e.g., 106), a client system (e.g., 108), or other component may employ the method 400 to determine whether a particular binary software component should be deployed based on a received security manifest. For example, a client system (e.g., 108) may receive a security manifest for a binary software component configured to control operation of a braking system for a car. The required characteristics for software components related to the braking system may specify, for example, that such components may not utilize any insecure APIs. The client system may analyze the received security manifest (e.g., the "Craftsmanship" information 240) to determine whether the binary software component utilizes any insecure APIs. If the security manifest indicates that the binary software component does not use any insecure APIs, the client system may determine that the binary software component should be deployed. However, if the security manifest indicates that the binary software component does use insecure APIs, the client system may determine that the binary software component should be rejected.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service users using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
performing, by at least one hardware processor of a security analyzer, a binary static analysis of a binary software component to determine one or more security characteristics of the binary software component, wherein the binary static analysis comprises examining a binary representation of a compiled binary software component without reference to a source code of the binary software component;
generating, by the at least one hardware processor of the security analyzer, a security manifest for the binary software component including the determined one or more security characteristics of the binary software component, wherein the determined one or more security characteristics included in the security manifest indicate one or more insecure application programming interfaces (APIs) used by the binary software component;
providing, by the at least one hardware processor of the security analyzer and over a communication network, the security manifest to a server computer to determine whether to deploy the binary software component based on the security manifest to client devices, wherein the server computer determining whether to deploy the binary software component based on the security manifest comprises:
examining, by a least one hardware processor of the server computer, the security manifest to identify that the binary software component uses the insecure API;
examining a security policy based on the identified insecure API associated with the binary software component to determine whether the security policy prevents the deployment of binary software components of this type, that use insecure APIs; and providing, by a least one hardware processor of the server computer, the security manifest and the binary software component to the client devices, wherein the client devices examine the security manifest based on their own policies in order to accept or reject the binary software component.

2. The method of claim 1, wherein the one or more security characteristics included in the security manifest include one or more compiler defense characteristics indicating one or more defensive techniques employed by a compiler used to build the binary software component.

3. The method of claim 2, wherein the defensive techniques indicated by the one or more compiler defense characteristics include at least one of: address space layout randomization (ASLR), or stack cookies.

4. The method of claim 1, wherein the one or more security characteristics included in the security manifest include one or more common vulnerability exposures (CVEs) representing known security vulnerabilities present in the binary software component.

5. The method of claim 1, wherein the server is configured to compare the one or more security characteristics in the security manifest to a security policy to determine whether to deploy the binary software component.

6. A computing device, comprising:
at least one hardware processor;
a non-transitory computer-readable storage medium coupled to the at least one hardware processor and storing programming instructions for execution by the at least one hardware processor, wherein the programming instructions, when executed, cause the at least one hardware processor to perform operations comprising:
performing a binary static analysis of a binary software component to determine one or more security characteristics of the binary software component, wherein the binary static analysis comprises examining a binary representation of a compiled binary software component without reference to a source code of the binary software component;
generating a security manifest for the binary software component including the determined one or more security characteristics of the binary software component, wherein the determined one or more security characteristics included in the security manifest indicate one or more insecure application programming interfaces (APIs) used by the binary software component; and
providing, over a communication network, the security manifest to a server computer to determine whether to deploy the binary software component based on the security manifest to client devices, wherein the server computer determining whether to deploy the binary software component based on the security manifest comprises:
examining, by a least one hardware processor of the server computer, the security manifest to identify that the binary software component uses the insecure API;
examining a security policy based on the identified insecure API associated with the binary software component to determine whether the security policy prevents the deployment of binary software components of this type, that use insecure APIs; and providing, by a least one hardware processor of the server computer, the security manifest and the binary software component to the client devices, wherein the client devices examine the security manifest based on their own policies in order to accept or reject the binary software component.

7. The computing device of claim 6, wherein the one or more security characteristics included in the security manifest include one or more compiler defense characteristics indicating defensive techniques employed by a compiler used to build the binary software component.

8. The computing device of claim 7, wherein the defensive techniques indicated by the one or more compiler defense characteristics include at least one of: address space layout randomization (ASLR), or stack cookies.

9. The computing device of claim 6, wherein the one or more security characteristics included in the security manifest include one or more common vulnerability exposures (CVEs) representing known security vulnerabilities present in the binary software component.

10. The computing device of claim 6, wherein the server is configured to compare the one or more security characteristics in the security manifest to a security policy to determine whether to deploy the binary software component.

11. The computing device of claim 6, wherein the computing device comprises at least one of an endpoint, a vehicle, an Internet-of-Things (IoT) device, an Enterprise-of-Things (EoT) device, or a mobile device.

12. One or more non-transitory computer-readable media containing instructions which, when executed, cause a computing device to perform operations comprising:
performing a binary static analysis of a binary software component to determine one or more security characteristics of the binary software component, wherein the binary static analysis comprises examining a binary representation of a compiled binary software component without reference to a source code of the binary software component;
generating a security manifest for the binary software component including the determined one or more security characteristics of the binary software component, wherein the determined one or more security characteristics included in the security manifest indicate one or more insecure application programming interfaces (APIs) used by the binary software component; and
providing, over a communication network, the security manifest to a server computer to determine whether to deploy the binary software component based on the security manifest to client devices, wherein the server computer determining whether to deploy the binary software component based on the security manifest comprises:
examining, by a least one hardware processor of the server computer, the security manifest to identify that the binary software component uses the insecure API;
examining a security policy based on the identified insecure API associated with the binary software component to determine whether the security policy prevents the deployment of binary software components of this type, that use insecure APIs; and
providing, by a least one hardware processor of the server computer, the security manifest and the binary software component to the client devices, wherein the client devices examine the security manifest based on their own policies in order to accept or
reject the binary software component.

13. The one or more computer-readable media of claim
12, wherein the one or more security characteristics included
in the security manifest include one or more compiler
defense characteristics indicating defensive techniques
employed by a compiler used to build the binary software
component.

14. The one or more computer-readable media of claim
13, wherein the defensive techniques indicated by the one or
more compiler defense characteristics include at least one
of: address space layout randomization (ASLR), or stack
cookies.

15. The one or more computer-readable media of claim
12, wherein the one or more security characteristics included
in the security manifest include one or more common
vulnerability exposures (CVEs) representing known security
vulnerabilities present in the binary software component.

16. The one or more computer-readable media of claim
12, wherein the server is configured to compare the one or
more security characteristics in the security manifest to a
security policy to determine whether to deploy the binary
software component.

17. A method, comprising:
receiving, by at least one hardware processor of a server
computer, from a security analyzer and over a communication network, a security manifest previously generated by performing a binary static analysis of a binary
software component, the security manifest including
one or more security characteristics of the binary
software component, wherein the binary static analysis
comprises examining a binary representation of a compiled binary software component without reference to a
source code of the binary software component;
determining, by the at least one hardware processor of the
server computer, whether the binary software component should be deployed on a particular client device
based at least in part on the one or more security
characteristics of the binary software component
included in the security manifest, wherein the determined one or more security characteristics included in
the security manifest indicate one or more insecure
application programming interfaces (APIs) used by the
binary software component, wherein the determining
whether the binary software component should be
deployed comprises:
examining the security manifest to identify that the
binary software component uses the insecure API;
examining a security policy based on the identified
insecure API associated with the binary software
component to determine whether the security policy
prevents the deployment of binary software components of this type, that use insecure APIs; and
providing the security manifest and the binary software
component to the particular client device, wherein
the particular client device examines the security
manifest based on its own policies in order to accept
or reject the binary software component; and
in response to determining that the binary software component should be deployed, deploying, by the at least
one hardware processor, the binary software component on the particular client device.

18. The method of claim 17, wherein determining whether
the binary software component should be deployed includes
determining whether the one or more security characteristics
of the binary software component included in the security
manifest meet or exceed required security characteristics.

19. The method of claim 18, wherein the required security
characteristics include minimum security characteristics for
binary software components deployed on the particular
client device.

20. The method of claim 18, wherein the required security
characteristics include minimum security characteristics for
a type of software component associated with the binary
software component.

21. The method of claim 17, further comprising:
in response to determining that the binary software component should not be deployed, rejecting deployment of
the binary software component.

22. The method of claim 21, wherein determining that the
binary software component should not be deployed includes
determining that the one or more security characteristics of
the binary software component included in the security
manifest do not meet or exceed required security characteristics.

23. The method of claim 21, wherein rejecting deployment of the binary software component includes providing
an indication that the binary software component was
rejected to an entity that provided the binary software
component.

24. A computing device, comprising:
at least one hardware processor;
a non-transitory computer-readable storage medium
coupled to the at least one hardware processor and
storing programming instructions for execution by the
at least one hardware processor, wherein the programming instructions, when executed, cause the at least one
hardware processor to perform operations comprising:
receiving, from a security analyzer and over a communication network, a security manifest previously
generated by performing a binary static analysis of a
binary software component, the security manifest
including one or more security characteristics of the
binary software component, wherein the binary static
analysis comprises examining a binary representation of a compiled binary software component without reference to a source code of the binary software
component;
determining whether the binary software component
should be deployed on a particular client device based
at least in part on the one or more security characteristics of the binary software component included in the
security manifest, wherein the determined one or more
security characteristics included in the security manifest indicate one or more insecure application programming interfaces (APIs) used by the binary software
component, wherein the determining whether the
binary software component should be deployed comprises:
examining the security manifest to identify that the
binary software component uses the insecure API;
examining a security policy based on the identified
insecure API associated with the binary software
component to determine whether the security policy
prevents the deployment of binary software components of this type, that use insecure APIs; and
providing the security manifest and the binary software
component to the particular client device, wherein
the particular client device examines the security
manifest based on its own policies in order to accept
or reject the binary software component; and
in response to determining that the binary software component should be deployed, deploying the binary software component on the particular client device.

25. The computing device of claim 24, wherein determining whether the binary software component should be deployed includes determining whether the one or more security characteristics of the binary software component included in the security manifest meet or exceed required security characteristics.

26. The computing device of claim 25, wherein the required security characteristics include minimum security characteristics for binary software components deployed on the particular client device.

27. The computing device of claim 25, wherein the required security characteristics include minimum security characteristics for a type of software component associated with the binary software component.

28. The computing device of claim 24, the operations further comprising:
in response to determining that the binary software component should not be deployed, rejecting deployment of the binary software component.

29. The computing device of claim 28, wherein determining that the binary software component should not be deployed includes determining that the one or more security characteristics of the binary software component included in the security manifest do not meet or exceed required security characteristics.

30. The computing device of claim 28, wherein rejecting deployment of the binary software component includes providing an indication that the binary software component was rejected to an entity that provided the binary software component.

31. One or more non-transitory computer-readable media containing instructions which, when executed, cause a computing device to perform operations comprising:
receiving, from a security analyzer and over a communication network, a security manifest previously generated by performing a binary static analysis of a binary software component, the security manifest including one or more security characteristics of the binary software component, wherein the binary static analysis comprises examining a binary representation of a compiled binary software component without reference to a source code of the binary software component;
determining whether the binary software component should be deployed on a particular client device based at least in part on the one or more security characteristics of the binary software component included in the security manifest, wherein the determined one or more security characteristics included in the security manifest indicate one or more insecure application programming interfaces (APIs) used by the binary software component, wherein the determining whether the binary software component should be deployed comprises:
examining the security manifest to identify that the binary software component uses the insecure API;
examining a security policy based on the identified insecure API associated with the binary software component to determine whether the security policy prevents the deployment of binary software components of this type, that use insecure APIs; and
providing the security manifest and the binary software component to the particular client device, wherein the particular client device examines the security manifest based on its own policies in order to accept or reject the binary software component; and
in response to determining that the binary software component should be deployed, deploying the binary software component on the particular client device.

32. The one or more computer-readable media of claim 31, wherein determining whether the binary software component should be deployed includes determining whether the one or more security characteristics of the binary software component included in the security manifest meet or exceed required security characteristics.

33. The one or more computer-readable media of claim 32, wherein the required security characteristics include minimum security characteristics for binary software components deployed on the particular client device.

34. The one or more computer-readable media of claim 32, wherein the required security characteristics include minimum security characteristics for a type of software component associated with the binary software component.

35. The one or more computer-readable media of claim 31, the operations further comprising:
in response to determining that the binary software component should not be deployed, rejecting deployment of the binary software component.

36. The one or more computer-readable media of claim 35, wherein determining that the binary software component should not be deployed includes determining that the one or more security characteristics of the binary software component included in the security manifest do not meet or exceed required security characteristics.

37. The one or more computer-readable media of claim 35, wherein rejecting deployment of the binary software component includes providing an indication that the binary software component was rejected to an entity that provided the binary software component.

* * * * *